Patented Aug. 23, 1927.

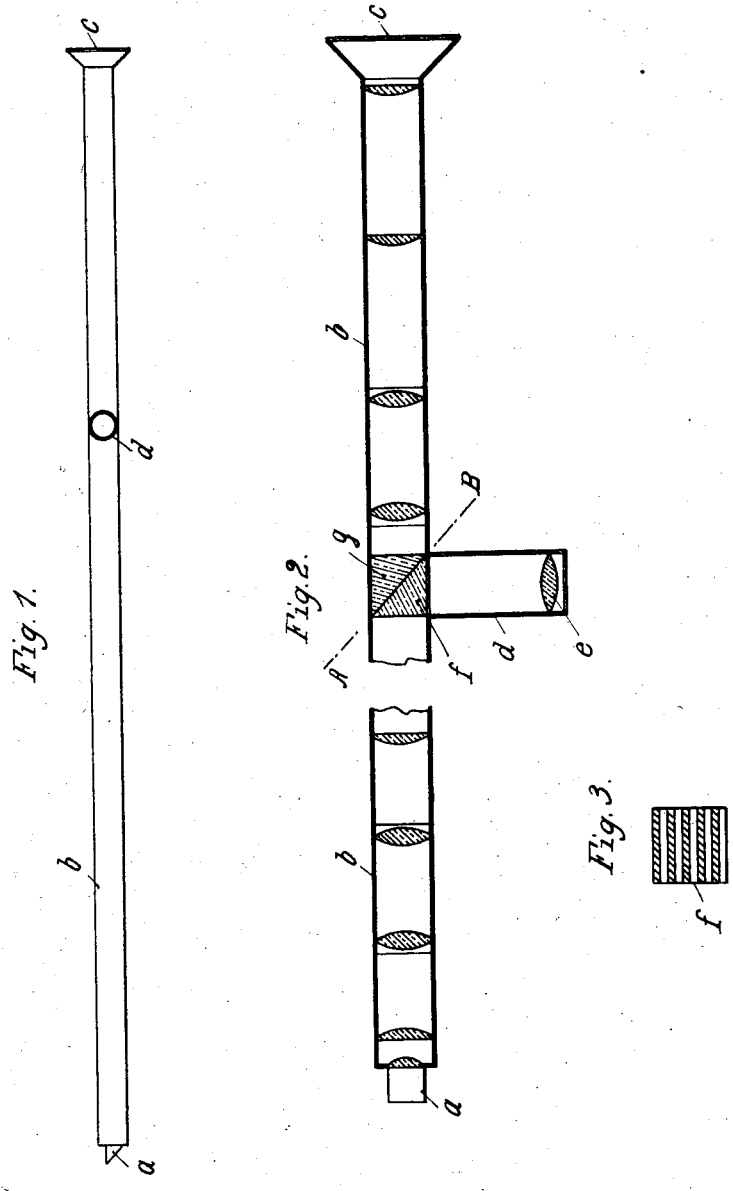

1,640,096

UNITED STATES PATENT OFFICE.

PAUL ROSENSTEIN, OF BERLIN, GERMANY.

OBSERVATION INSTRUMENT.

Application filed February 16, 1927, Serial No. 168,616, and in Germany November 24, 1925.

My invention relates to observation instruments, its object being to provide devices for observation instruments, which enable a number of persons to use the instrument simultaneously with the operator. In this manner a teacher or any other lecturer can let several persons share his observations even in cases where a moving object is being observed, which for this reason or others may not reappear, or, if so, only for a short time. The invention is in particular intended for use in connection with observation instruments used by physicians in examining the inner cavities of the body.

With this object and others which will appear from the following specification in view the invention consists of the following combinations of details.

With reference to the drawing—

Fig. 1 shows a longitudinal view of an observation instrument according to the invention.

Fig. 2 shows a longitudinal section of Fig. 1 on an enlarged scale.

Fig. 3 is a view of the surface A B in Fig. 2.

The object glass $a$ is fixed to one end of the objective tube. A projection surface or screen $c$ is set on the other end and is about 1¼ inch in diamter and consists preferably of a translucent screen. A tube $d$ branches off from the objective tube $b$, being provided at the end with an eye glass $e$. At the point of bifurcation in the ray path a prism $f$ and a second prism $g$ are provided, their end surfaces being directed perpendicularly to the longitudinal axis of the objective tube $b$ and touching each other in a plane. The plane of contact, as shown in Fig. 3, is provided with a reflecting lining laid in alternate strips. This has the effect that part of the rays are thrown by the tube through the branch tube $d$ to the eye glass $e$, whereas the remaining rays pass on preferably in a straight line through a branch or continuation of the objective tube to the projection surface $c$. The same picture is hereby produced on the projection surface $c$ which is seen through the object glass $e$. A large number of persons can see the picture at this point while the operator is looking at it through the eye glass $e$. The branch tube $d$ is located far enough away from the translucent screen $c$, in order not to allow the head of the observer at $e$ to interfere with the observation of the translucent screen $c$. Those who desire to see the picture on the translucent screen $c$ can stand in a semicircle around the translucent screen $c$ and are not hindered therein by the observer at $e$.

Having now more fully described the nature of my invention and in what manner the same is to be performed, I declare that what I claim is:

1. An observation instrument consisting of an objective tube terminating in two branches, a projection surface at the end of one branch and an eye glass at the end of the other branch, and means within the objective tube at the junction of the two branches and objective tube for rendering the observed pictures visible both on the projection surface as well as in the eye glass.

2. An observation instrument consisting of a straight objective tube having an object glass at one end and a translucent screen on the end of the objective tube opposite the object glass, a lateral branch tube having one of its ends attached between the ends of the objective tube and an eye glass at the other end of said lateral branch tube and removed from the translucent screen, and means within the objective tube at the branch tube connection for rendering the observed picture visible both on the translucent screen as well as in the eye glass.

In testimony whereof I have affixed my signature.

PAUL ROSENSTEIN.